March 20, 1934.　　H. A. CENTERVALL　　1,951,345
TRANSMISSION MECHANISM
Filed Sept. 23, 1931
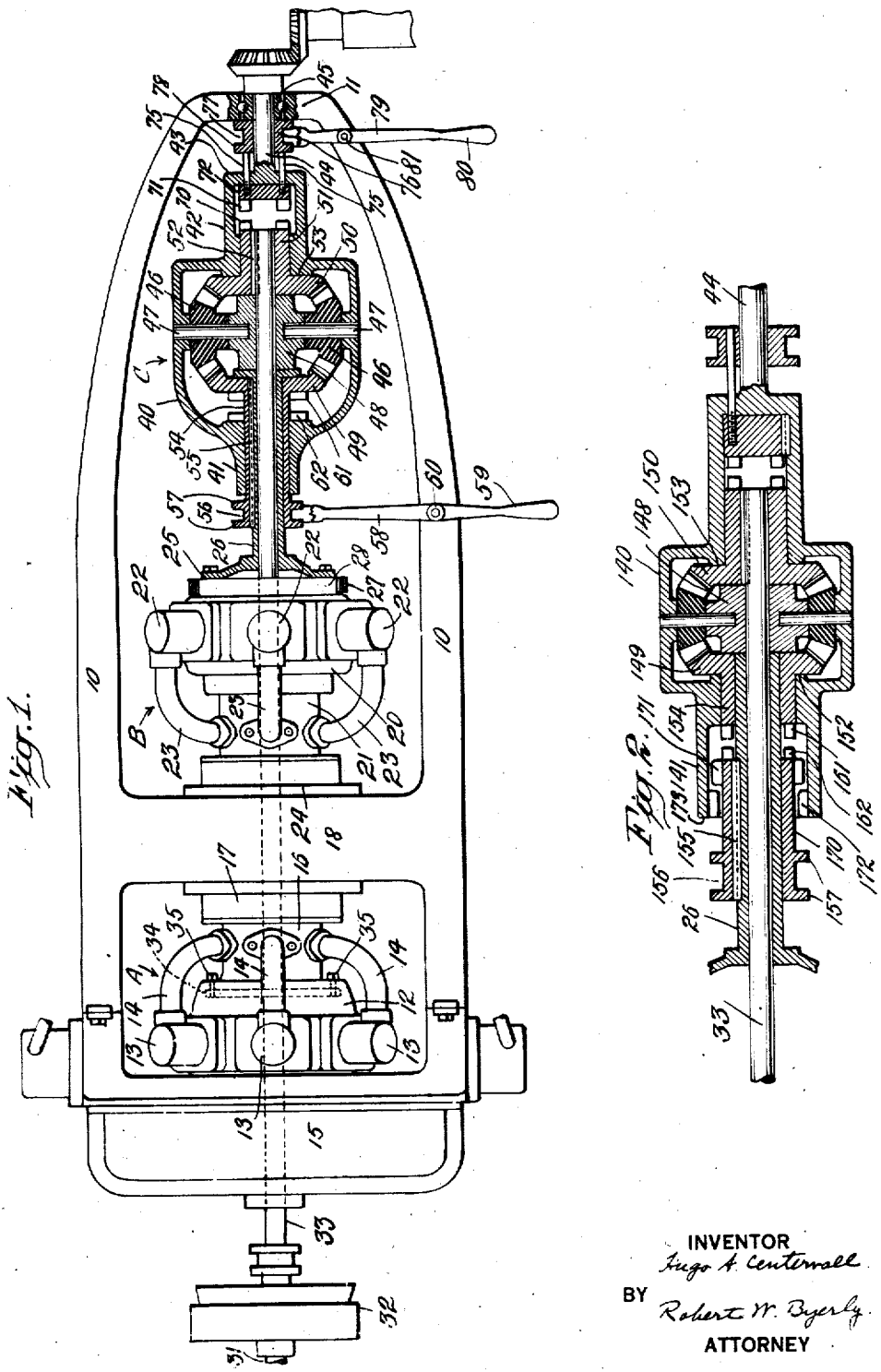
INVENTOR
Hugo A. Centervall
BY Robert W. Byerly
ATTORNEY Patented Mar. 20, 1934

1,951,345

UNITED STATES PATENT OFFICE 1,951,345

TRANSMISSION MECHANISM

Hugo A. Centervall, New York, N. Y., assignor to Manly Corporation, New York, N. Y., a corporation of Delaware Application September 23, 1931, Serial No. 564,495

19 Claims. (Cl. 60—53)

This invention relates to power transmission devices. The object of the invention is to provide a highly efficient device of this character in which the speed and torque of the final driven member may be varied by stepless variations.

A more specific object is to provide a power transmission device in which the speeds of a plurality of power transmission elements may be combined and the resulting speed thus obtained transmitted to a driven member.

A still further object is to transmit to a driven member, alternatively, the speed of either of two power transmission elements, or differential speed obtained by modifying the speed of one of said elements by the other.

Other objects of the invention will appear from the following description of an illustrative embodiment of the present invention and from the claims.

In the following description of my invention, I have used a hydraulic transmission to illustrate a variable speed transmission, but it is to be understood that I do not limit myself to the use of a hydraulic transmission and any preferred type of variable-speed power transmission such as an electrical or mechanical transmission may be employed.

In the drawing, Figure 1 is a top plan view of one embodiment of my invention, certain parts being shown in section, and Figure 2 is a modification of the differential driving mechanism shown in Figure 1.

Before explaining in detail the present invention, it is to be understood that the invention is not limited in its application to the details of construction and arrangement of parts illustrated in the accompanying drawing, since the invention is capable of other embodiments and of being practiced and carried out in various ways. It is also to be understood that the phraseology or terminology reported herein is for the purpose of description and not for limitation, and it is not intended to limit the invention beyond the terms of the several claims hereto appended as considered in view of the prior art and the requirements thereof.

Referring to the drawing, the embodiment of my invention as shown in Figure 1 comprises a variable stroke pump A having fluid connection with a hydraulic motor B and of another device which I term a differential driving mechanism C. All of these are carried by a frame 10 upon which they are suitably mounted. In the drawing such parts as are rigidly connected when assembled are for the most part shown as one integral piece, although, of course, in actual construction they are made in several pieces to the extent necessary to permit assembling.

The pump A and the hydraulic motor B may be of any desired type as for example those shown in United States Letters Patent No. 1,266,606 issued to Charles M. Manly on May 21, 1918, or of the type such as shown in United States Letters Patent No. 925,148 issued to Harvey D. Williams on June 15, 1909 or such as shown in United States Letters Patent No. 1,757,483 issued to H. S. Held-Shaw et al. on May 6, 1930. I prefer, however, to use those shown in my co-pending application filed July 11, 1931 and given Serial Number 550,198 and have accordingly illustrated the present invention in connection with them. As indicated in Fig. 1 of the accompanying drawing, the pump A comprises a hollow rotor 12 upon which are carried a plurality of outwardly-discharging radial cylinders 13 having fluid connections through curved hollow arms 14 with ports in a reduced hub portion 16 of the rotor 12, said ports being adapted to register successively with intake and exhaust ports in a stationary trunnion-like valve member, not shown. Each cylinder is fitted with the usual piston and connecting rod assembly and the inner ends of the connecting rods bear against a laterally shiftable crank mechanism by which their stroke may be varied from zero to maximum in either direction; the pistons, connecting rods and crank mechanism are not shown in the accompanying drawing. The rotor 12 is supported at one end by the removable transverse end plate 15 which is suitably secured to the frame 10, and on its other end by the trunnion-like valve member, not shown, which is received within the reduced hub portion 16. The valve member has an exposed flange portion 17 which is rigidly secured by any suitable means to a central supporting member, here shown as a transverse portion 18 of the frame 10. The eccentricity of the crank mechanism may be varied by any suitable means.

The hydraulic motor B is generally similar to the pump A except that it is here assumed to have a fixed crank member so that its pistons have a corresponding fixed stroke; the motor B may be made of variable stroke if desired, however. It comprises a hollow rotor 20 having a reduced hub portion 21. Upon the rotor 20 are carried a plurality of outwardly-discharging radial cylinders 22 having fluid connections through curved hollow arms 23 with ports in the reduced hub portion 21, said ports being adapted to register successively with the intake and exhaust ports of the trunnion-like valve member, not shown, of the motor B. One end of this valve member is received within the hub portion 21 of the rotor 20 and on its other end is formed an exposed flange 24 which is rigidly secured to the central supporting member 18 upon which the entire weight of the motor B is carried. The rear or outer end of the rotor 20 is closed by a plate 25 having a hollow shaft 26 which constitutes the driven shaft of the motor B. There is also provided a braking mechanism for holding the rotor against rotation. It comprises a brake band 27 surrounding and adapted to grip a brake drum 28 formed on the rotor 20. The braking mechanism may be supported and operated by any appropriate means, not shown.

Formed within the central member 18 are passages, not shown, connecting with similar passages in the valve members, not shown, of the pump A and the motor B and thus forming with them a closed fluid circuit through which pressure fluid is delivered from the pump A to the motor B and the fluid exhausted by the motor B is returned to the pump A.

As will be readily understood, by varying the stroke of the pump pistons the speed of the driven shaft 26 of the motor B may be varied to whatever extent desired from zero to maximum in either direction of rotation and the torque of said shaft 26 will increase proportionally as its speed is decreased.

The driving shaft 31 of the engine or other source of power, not shown, is operatively connected through the usual clutch mechanism 32 to the power input shaft 33 of my improved power transmission device. As indicated in the drawing and in a manner generally similar to that shown in Figure 14 of Letters Patent of the United States granted to Charles M. Manly on May 21, 1918, Number 1,266,606, the central member 18 and the various parts of the pump A and the motor B, including the driven shaft 26 of the motor, are all modified to provide alined central longitudinal passages for receiving the shaft 33 which extends through them and terminates in the differential driving mechanism C as will be described later. The pump A is driven by the shaft 33, as through a plate 34 attached to said shaft 33 and secured to the rotor 12 as by cap screws 35.

The differential driving mechanism C comprises a differential housing 40, rotatably supported from the frame 10 by any suitable means, not shown, and having on one end a hollow hub portion 41 and on its other end another hollow hub portion 42. The hub portion 42 is closed on its outer end by an end section 43 carrying a shaft 44 which constitutes the final driven shaft of my power transmission device and which is adapted to be connected to the mechanism to be operated. The shaft 44 may be formed integrally with the end section 43 or may be a separate member suitably secured to said end section 43 or the hub portion 42. The shaft 44 is mounted in a suitable bearing member 45 in the transverse end section 11 of the frame 10.

The hollow driven shaft 26 of the hydraulic motor B and the shaft 33, which passes through and extends beyond the shaft 26, are received witin the differential housing 40 through the bore of the hollow hub 41.

Within the differential housing 40 are pinions 46 rotatably mounted on pivots 47 which are supported on one of their ends by the differential housing 40 and on their other ends by a central distance piece 48 rotatably mounted upon the shaft 33 and held in place thereon by the end of the shaft 26 and the gear 50.

Meshing with the pinions 46 are differential gears 49 and 50, here shown as of equal size. The gear 50 is driven by the shaft 33 to which it may be secured in any desired manner; in the preferred embodiment, however, the gear 50 is formed with a hollow hub 51 into which the shaft 33 is received and to which it is keyed as by the key 52. The gear hub 51 is rotatably mounted within the bore of the hub portion 42 of the differential housing 40, the gear and gear hub being held in position by the shoulders 53 in the housing 40 cooperating with other parts of the mechanism.

The differential gear 49 is driven by the shaft 26 of the motor B to which it may be secured in any suitable manner. As will later be described, it may be desirable under some conditions to disengage the gear 49 from mesh with the pinions 46 and to clutch the differential housing 40 to the shaft 26. I have, therefore, shown the gear 49 as formed with a hollow hub portion 54 which projects beyond the hub portion 41 of the differential housing 40, in which said gear hub 54 is rotatably mounted. The bore of the hub 54 is made of proper size to receive the shaft 26 to which it is keyed as by the key 55 in such a manner as to prevent its independent rotation but to permit the hub 54 and the gear 49 to be moved longitudinally of the shaft 26. For effecting such movement there is provided an annular groove 56 formed by a pair of circumferential flanges 57 upon the outer periphery of the projecting end of the hub 54. Suitably engaged within the groove 56 is one end of a shifting lever 58 having a handle portion 59 and being pivoted as at 60 upon the frame 10 by which it is carried. Formed on the outer face of the gear 49 are driving dogs 61 adapted to be shifted into engagement with and to co-act with similar driving dogs 62 formed on the inner end of the hub 41 of the housing 40.

I also provide means by which the shaft 33 may be clutched to the differential housing 40. For this purpose I have shown a high speed clutch of a well known type comprising teeth 70 formed upon the outer end of the gear 50. These teeth 70 are adapted to be engaged with similar teeth 71 formed upon the inner end of a member 72 which is located within the hub portion 42 of the differential housing 40. The member 72 is formed with suitable keys, not shown, for keying it to the hub 42, the arrangement and fits being such as to allow the member to be moved longitudinally of the hub 42 but preventing independent rotation of one of these parts with respect to the other. Attached to the outer end of the member 72 are one of the ends of the pins 75 which project through openings in the end section 43 of the hub 42. To the other ends of the pins 75 is attached a shiftable member 76 slidably mounted upon the shaft 44. The member 76 is provided with an annular groove 77 formed by a pair of flanges 78. Suitably engaged within the groove 77 is one end of a shifting lever 79 having a handle portion 80 and pivoted as at 81 upon the frame 10 by which it is carried.

As is well known, the speed and direction of rotation of the differential housing 40, and hence of the final driven shaft 44, will be determined by the relative speeds and directions of rotation of the differential gears 49 and 50. The gear 50, which is connected to the shaft 33, will, of course, be rotated at the same speed as the shaft 33 and usually in one direction of rotation only as prime movers themselves are not ordinarily reversible. But by varying the stroke of the pump A, the shaft 26 of the hydraulic motor B and its connected gear 49 may be driven at any desired speed from zero to maximum in either direction of rotation. The velocity ratio of the housing 40 and the final driven shaft 44 to the shaft 33 may, therefore, be altered by stepless variations from zero to maximum by simply varying the stroke of the pump A.

For purposes of illustration, let us assume that the parts are in the positions shown in Figure 1, that the hydraulic circuit is completely filled with fluid and that the gear 50 is being driven at a constant speed in a clockwise direction of rotation. Let us also assume that the stroke of the pump A is such that the shaft 26 of the motor B and the gear 49 are being driven at the same speed as that of the gear 50 but in a counterclockwise direction of rotation. As the gears 49 and 50 are here shown as of equal size, the housing will then be stationary and no power will be transmitted, the pinions 46 merely rotating on their pivots 47.

If the pump stroke is reduced, the speed of the shaft 26 and the gear 49 will likewise be reduced. As soon as there is a difference in the speeds of the gears 49 and 50, compensating action will take place through the pinions 46 and the differential housing 40 will begin to rotate in a clockwise direction, its speed increasing proportionally as the speed of the gear 49 is reduced.

When the pump stroke has been reduced to zero and the shaft 26 and the gear 49 have thus been stopped, the housing 40 will, of course, continue to be driven in a clockwise direction of rotation and will have reached a speed equal to one half the speed of the gear 50. All power will then be transmitted through purely mechanical means. If the device is to be operated at this speed for a considerable period of time, the hydraulic apparatus may be relieved of all strain by tightening the brake band 27 so that it grips the drum 28 on the rotor 20 and prevents its rotation.

The brake band 27 being released, if the stroke of the pump A is now made such that the shaft 26 of the motor B and the gear 49 are driven in a clockwise direction of rotation, the speed of the housing 40 will be still more increased. When the speeds of gears 49 and 50 have been made the same in a clockwise direction of rotation, there will then be no differential action and the entire differential driving mechanism C will revolve as a unit and at a speed equal to that of the gears 49 and 50.

The housing 40 and the final driven shaft 44 may, therefore, be driven at any desired speed from zero to maximum. When the gears 49 and 50 are rotating in opposite directions, the speed of the housing 40 will be one half the difference of their speeds when these gears are of equal size as in this example. When the gears 49 and 50 are rotating in the same direction, the speed of the housing will be one half the sum of their speeds. The torque will increase proportionally as the speed of the housing 40 is decreased. Whenever the hydraulic transmission is in use, part of the power will be transmitted through it and its connected gear 49 and part will be transmitted through purely mechanical means comprising the shaft 33 and the gear 50.

The direction of rotation of the housing 40 and of the final driven shaft 44 with respect to that of the shaft 33 may obviously be reversed by making the pump A and the motor B of such capacities that the shaft 26 and the gear 49 may be driven in the direction of rotation opposite to that of the shaft 33 at a speed greater than that of said shaft 33 and the gear 50. Similarly, the housing 40 may be driven in the same direction of rotation as that of the shaft 33 and at a greater speed than that of said shaft by making the capacities of the pump A and the motor B such that the shaft 26 and its connected gear 49 may be driven at a greater speed than that of the shaft 33 in the same direction of rotation as that of said shaft; an "over-drive" may thus be effected.

When the speeds and directions of rotation of gears 49 and 50 have been made the same, a purely mechanical direct drive may be effected by clutching the housing 40 to the gear 50 and hence connecting said housing 40 to the shaft 33. This may be accomplished by moving the handle 80 of the shifting lever 79 so as to shift the members 76 and 72 toward the gear 50 and thus causing the teeth 71 on the member 72 to come into engagement with the teeth 70 on the gear 50. The gear 49 may now be disengaged from mesh with the pinions 46 by means of the shifting lever 58. The motor B may then be stopped by reducing the stroke of the pump A to zero. All power will then be transmitted through a purely mechanical direct drive with no losses in the hydraulic transmission except the slight amount needed to rotate the rotor 12 of the pump A idly on its bearings.

Under some conditions it may be desirable to use only the hydraulic transmission for transmitting the power. This may be accomplished by moving the handle 59 of the shifting lever 58 so as to disengage the gear 49 from mesh with the pinions 46 and to bring the driving dogs 61 on the gear 49 into engagement with the similar driving dogs 62 on the housing 40. In shifting these parts, the housing 40 is preferably brought to a stop by adjusting the stroke of the pump A so that the gear 49 is rotated at a speed equal to that of the gear 50 but in the opposite direction. The gear 49 is then disengaged from mesh with th pinions 46, the stroke of the pump A is reduced to zero and the driving dogs 61 and 62 are engaged. Shifting may also be effected by disengaging the clutch mechanism 32 before shifting the parts. When the driving dogs 61 and 62 are in engagement, power will be transmitted only through the hydraulic transmission, by means of the shaft 26, the hub 54 of the gear 49 and the housing 40. The gear 50 will rotate but will transmit no power, merely causing the pinions 46 to rotate idly on their pivots 47. The speed and direction of rotation of the housing 40 and the final driven shaft 44 will then be entirely determined by the stroke of the pump A and may, therefore, be made any desired amount from zero to maximum within the limits of the hydraulic apparatus and in either a clockwise or counter-clockwise direction of rotation. This may be particularly advantageous under some conditions, as in parking a vehicle on which this device is employed.

The device may be put into "neutral" so that no power may be transmitted by moving the lever 58 so as to disengage the gear 49 from mesh with the pinions 46, the lever 58 not being moved sufficiently to engage the driving dogs 61 and 62.

Figure 2 shows an alternative embodiment of the differential driving mechanism employed in my invention. In it the differential gear 149 is formed with a hub 154 and is rotatably mounted upon the end of the hollow shaft 26 of the motor B. The differential housing 140 is modified to contain shoulders 152 which together with the shoulders 153 on the opposite inner end of said housing, hold the gear 149, the central distance piece 148 and the differential gear 150 in proper position. Formed upon the end of the hub 154 are driving dogs 161. Surrounding the shaft 26 is a shiftable member 170 keyed, as by the key 155, so as to permit the member 170 to be shifted longitudinally of the shaft 26 but preventing its independent rotation.

One end of the shiftable member 170 extends into the bore of the hollow hub 141 of the housing 140 and upon that end are formed driving dogs 162 adapted to be engaged with the driving dogs 161 on the gear hub 154. Also formed upon the outer periphery of this end of the member 170 is a spur gear 171 adapted to be engaged with an internal gear 172 formed in the end piece 173 of the hub 141. For shifting the member 170 there is provided, upon its end which projects from the hub 141, an annular groove 156 formed by a pair of circumferential flanges 157 and adapted to engage one end of a shifting lever similar to that shown in Figure 1 or to be actuated by any other preferred shifting mechanism. The other parts of this modified form of the differential driving mechanism are substantially the same as in the embodiment shown in Figure 1 and have already been described.

In this modified embodiment, the gear 149 is constantly in mesh with the pinions. If the shifting member 170 be moved toward the hydraulic motor B, the spur gear 171 will be engaged with the internal gear 172. Power will then be transmitted only through the hydraulic transmission; the gear 150 will be rotated and, through the pinions, will rotate gear 149 but these will transmit no power. If the member 170 is shifted away from the motor B, gears 171 and 172 will then be disengaged and the parts will be in the positions shown in Figure 2. The hydraulic motor shaft 26 is then connected with neither the differential housing 140 or the differential gear 149. The device is, therefore, in its "neutral" position and no power can then be transmitted. If the member 170 is moved still farther away from the motor B, the driving dogs 162 will be engaged with the driving dogs 161 on the end of the hub 154 of the gear 149. The gear 149 will then be connected with the shaft 26 of the motor B and power may be transmitted through both the hydraulic transmission and its connected gear 149 and through the shaft 33 and its connected gear 150.

As previously explained, when the speed and direction of rotation of the differential gears 149 and 150 have been made the same, the high speed clutch may be engaged so as to effect a mechanical direct drive. If desired, the member 170 may then be shifted into its neutral position as shown in Figure 2. All power will then be transmitted through the driving shaft 33, the gear 150 and the differential housing 140 as has also been explained. The stroke of the pump A may then be reduced to zero to eliminate losses in the hydraulic apparatus.

Compensating action between the differential gears 149 and 150 and control of speed and direction of rotation of the final drive shaft are the same as with the other embodiment already described.

It will be observed that I have provided a power transmitting device in which power may be transmitted through the hydraulic transmission only, partly through the hydraulic transmission and partly through purely mechanical means or entirely through purely mechanical means, at the discretion of the operator.

When only the hydraulic transmission is being used for the transmission of power, the speed of the driven member may be varied at will within the limits of the hydraulic apparatus.

When power is being transmitted partly through the hydraulic transmission and partly through purely mechanical means, the velocity ratio of the final driven member to the power input shaft may likewise be altered from zero to maximum through stepless variations without disconnecting the source of power by simply varying the pump stroke. This makes for quick acceleration and deceleration and for ease of operation. Higher efficiency is secured than by the use of the hydraulic transmission alone, as purely mechanical power transmitting means are as a general rule more efficient than hydraulic or other variable speed transmissions. It also makes it possible to use a smaller size of hydraulic tranmission than would be required if all power were transmitted through said hydraulic transmission and thus reduces the size, weight and cost of the mechanism.

Power may be transmitted through purely mechanical means at two speeds; one is a reduced speed of the final driven member with respect to the speed of the power input shaft and the other is at a one to one ratio or direct drive.

The device, therefore, makes it possible to use the hydraulic transmission primarily for starting and overcoming the initial resistance of the load, leaving to the more efficient mechanical means the work of continuously transmitting power when no change in speed ratios is required.

The provision of the neutral position is also of importance as it positively assures that no power can be transmitted and that there can be no "creeping" of the driven member.

While I have shown the differential gears as of the same size, it will be readily understood that they may be of different sizes if desired. It will likewise be understood that the construction of the differential driving mechanism itself may be varied and that other types of differential devices may be employed, as for example, the spur gear type. It will also be understood that the source of power may be of either constant or variable speed and that separate sources of power may be used for driving the pump A and the differential gear 50 instead of employing a single source of power as shown herein.

What I claim is:

1. A power transmission device comprising a plurality of driving shafts, a driven shaft, mechanical means for controlling the speed of one of said shafts, a differential gear assembly engageable with said driving shafts and with said driven shaft, and other means for clutching said driven shaft to said mechanically controlled driving shaft to be independently driven thereby.

2. A power transmission device comprising a plurality of driving elements, a driven shaft for varying the speed of one of said elements with relation to the speed of the other of said elements, a differential gear assembly including two gears having means respectively for connection to said respective elements, a housing for said differential assembly, freely rotatable pinions supported in said housing in position to engage both of said gears, a driven member connected to said housing and alternative means for connecting either of said elements directly to said housing.

3. A power transmission device comprising two concentrically arranged power transmission elements, a driven shaft for varying the speed of one element with relation to the speed of the other of said elements, a differential gear assembly including a housing, a driven member connected to said housing, two gears in said housing, pinions rotatably mounted on said housing intermediate said gears, means for connecting each of said elements directly with one of said gears, and other means for alternatively connecting either of said elements directly with said housing.

4. A power transmission device comprising a plurality of driving shafts, hydraulic transmission means of controlling the speed of one of said shafts, a differential gear assembly including a housing, a plurality of differential gears therein, a bevel gear mounted on bearings supported by said housing, a driven shaft connected to said housing, means for connecting said driving shafts with said differential gears respectively, and alternative means for connecting the shaft driven by said hydraulic transmission directly to said housing so that said driven shaft may be driven from the hydraulic transmission alone.

5. A power transmission device comprising a first driving shaft, an hydraulic transmission actuated by said first driving shaft, a second driving shaft actuated by said hydraulic transmission, a driven element engageable with both of said driving shafts for transmitting the differential speed thereof to said driven element, and alternative means for driving said driven element from said second driving shaft alone.

6. A power transmission comprising a plurality of driving shafts, a driven shaft, means disposed in power-transmitting relation between said driving shafts for transmitting the differential speed of said driving shafts to said driven shaft, a variable stroke pump driven by one of said driving shafts, a hydraulic motor actuated by said hydraulic pump and positioned intermediate said pump and said differential speed transmission means for actuating the other of said driving shafts, said last named shaft being hollow and said first named shaft extending therethrough and having means for directly engaging said driven shaft.

7. A power transmission device comprising a plurality of concentric driving shafts, one of which extends through the other, a driven element, a differential assembly including a pair of bevel gears, for transmitting the differential speed of said shafts to said driven element, a hydraulic pump actuated by one of said driving shafts, an hydraulic motor intermediate said pump and said differential assembly actuated by said pump, and concentrically positioned around said driving shaft for actuating the outer of said driving shafts, the bevel gear nearer said motor being engageable with said motor shaft and having a central aperture through which said pump shaft extends, said pump shaft having means for engaging the more distant of said bevel gears, said driven element being concentric with said pump shaft but positioned on the opposite side of said differential assembly from said motor.

8. A power transmission device comprising a hydraulic pump, a hydraulic motor driven by said pump, a differential gear assembly and a driven shaft, a plurality of driving shafts and means for interconnecting said differential assembly with said driving shafts and said driven shaft respectively, one of said driving shafts being actuated by said motor and connecting with the near side of said differential assembly, the other of said driving shafts extending through said pump and said motor and said first mentioned shaft and partly through said differential assembly, and said pump being fixed thereto and driven thereby, said second mentioned shaft having means whereby it may be connected directly to said driven shaft.

9. A power transmission device comprising a plurality of input power transmission elements, a hydraulic variable speed gear for driving one of said elements, a power transmission output element, power translating means adapted to receive the energy of said input elements and to deliver the differential energy to said output element, and alternative means for connecting said output transmission element directly to one of said input elements, said input elements being concentrically arranged, one of said elements extending through and beyond the other.

10. A power transmission device comprising in combination a power shaft, a driving shaft having a fixed velocity ratio thereto, a second driving shaft having a variable velocity ratio thereto, and a driven shaft velocity compensating means disposed in power-transmitting relation between said driving shafts and said driven shaft, and means to connect said driven shaft to one of the driving elements of said compensating means.

11. A power transmission device comprising in combination a power shaft, a driving shaft having a fixed velocity ratio thereto, a second driving shaft having a variable velocity ratio thereto, and a driven shaft velocity compensating means disposed in power-transmitting relation between said driving shafts and said driven shaft, and means for engaging one of said driving shafts with the driven element of said compensating means.

12. A power transmission device comprising in combination a power shaft, a driving shaft having a fixed velocity ratio thereto, a second driving shaft having a variable velocity ratio thereto, and a driven shaft velocity compensating means disposed in power-transmitting relation between said driving shafts and said driven shaft, and means for engaging either or both of said driving shafts with the driven element of said compensating means.

13. A power transmission shaft comprising a plurality of driving shafts, the respective speeds of which may be varied with relation to one another, a driven shaft, a velocity compensating device positioned in power transmitting relation between said driving shafts and said driven shaft, said compensating device including two differential gears and an intermediate pinion, a sleeve integral with one of said gears and slideably keyed to one of said driving shafts whereby said gear may be moved out of mesh with said pinion.

14. In a power transmission device, a first driving shaft, a second driving shaft having a variable velocity ratio to said first driving shaft, a driven shaft, a velocity compensating means for operatively connecting said driving shafts with said driven shaft and means for operatively connecting one of said driving shafts with said driven shaft to cause it to be independently driven thereby.

15. A power transmission device comprising a first driving shaft, a variable speed transmission actuated by said first driving shaft, a second driving shaft actuated by said variable speed transmission, a driven shaft, velocity compensating means engageable in power transmitting relationship with said driving shafts and said driven shaft and means for operatively connecting said first driving shaft with said driven shaft to cause it to be independently driven thereby.

16. A power transmission device comprising a first driving shaft, a variable speed transmission actuated by said first driving shaft, a second driving shaft actuated by said variable speed transmission, velocity compensating means engageable in power transmitting relation with said driving shafts and said driven shaft, means for operatively connecting said first driving shaft with said driven shaft to cause it to be independently driven thereby and means for disengaging said second driving shaft from operative connection with said velocity compensating means.

17. A power transmission device comprising a first driving shaft, a variable speed transmission actuated by said first driving shaft, a second driving shaft actuated by said variable speed transmission, a driven shaft, velocity compensating means engageable in power transmitting relation with said driving shafts and said driven shaft and means for operatively connecting said driven shaft with either of said driving shafts to cause said driven shaft to be independently driven thereby.

18. A power transmission device comprising a first driving shaft, a variable speed transmission actuated by said first driving shaft, a second driving shaft actuated by said variable speed transmission, a driven shaft, velocity compensating means engageable in power transmitting relation with said driving shafts and said driven shaft and means for disengaging one of said driving shafts from operative connection with said velocity compensating means whereby no power is transmitted to said driven shaft.

19. A power transmission device comprising a first driving shaft, a variable speed transmission actuated by said first driving shaft, a second driving shaft actuated by said variable speed transmission, a driven shaft, velocity compensating means in power transmitting relation with said driving shafts and said driven shafts, and mechanical braking means operatively connectible with said second driving shaft for holding it against rotation whereby all power is transmitted through said first driving shaft and said velocity compensating means.

HUGO A. CENTERVALL.

CERTIFICATE OF CORRECTION.

Patent No. 1,951,345.　　　　　　　　　　　　　　March 20, 1934.

HUGO A. CENTERVALL.

It is hereby certified that error appears in the printed specification of the above numbered patent requiring correction as follows: Page 2, line 70, for "witin" read within; page 4, line 143, claim 2, and page 5, line 6, claim 3, for "driven shaft" read a variable speed gear; and that the said Letters Patent should be read with these corrections therein that the same may conform to the record of the case in the Patent Office.

Signed and sealed this 15th day of May, A. D. 1934.

Bryan M. Battey (Seal)　　　　　　　　　　　　　　　　　　Acting Commissioner of Patents.

driving shaft actuated by said variable speed transmission, a driven shaft, velocity compensating means engageable in power transmitting relationship with said driving shafts and said driven shaft and means for operatively connecting said first driving shaft with said driven shaft to cause it to be independently driven thereby.

16. A power transmission device comprising a first driving shaft, a variable speed transmission actuated by said first driving shaft, a second driving shaft actuated by said variable speed transmission, velocity compensating means engageable in power transmitting relation with said driving shafts and said driven shaft, means for operatively connecting said first driving shaft with said driven shaft to cause it to be independently driven thereby and means for disengaging said second driving shaft from operative connection with said velocity compensating means.

17. A power transmission device comprising a first driving shaft, a variable speed transmission actuated by said first driving shaft, a second driving shaft actuated by said variable speed transmission, a driven shaft, velocity compensating means engageable in power transmitting relation with said driving shafts and said driven shaft and means for operatively connecting said driven shaft with either of said driving shafts to cause said driven shaft to be independently driven thereby.

18. A power transmission device comprising a first driving shaft, a variable speed transmission actuated by said first driving shaft, a second driving shaft actuated by said variable speed transmission, a driven shaft, velocity compensating means engageable in power transmitting relation with said driving shafts and said driven shaft and means for disengaging one of said driving shafts from operative connection with said velocity compensating means whereby no power is transmitted to said driven shaft.

19. A power transmission device comprising a first driving shaft, a variable speed transmission actuated by said first driving shaft, a second driving shaft actuated by said variable speed transmission, a driven shaft, velocity compensating means in power transmitting relation with said driving shafts and said driven shafts, and mechanical braking means operatively connectible with said second driving shaft for holding it against rotation whereby all power is transmitted through said first driving shaft and said velocity compensating means.

HUGO A. CENTERVALL.

CERTIFICATE OF CORRECTION.

Patent No. 1,951,345.  March 20, 1934.

HUGO A. CENTERVALL.

It is hereby certified that error appears in the printed specification of the above numbered patent requiring correction as follows: Page 2, line 70, for "witin" read within; page 4, line 143, claim 2, and page 5, line 6, claim 3, for "driven shaft" read a variable speed gear; and that the said Letters Patent should be read with these corrections therein that the same may conform to the record of the case in the Patent Office.

Signed and sealed this 15th day of May, A. D. 1934.

Bryan M. Battey (Seal)  Acting Commissioner of Patents.